UNITED STATES PATENT OFFICE.

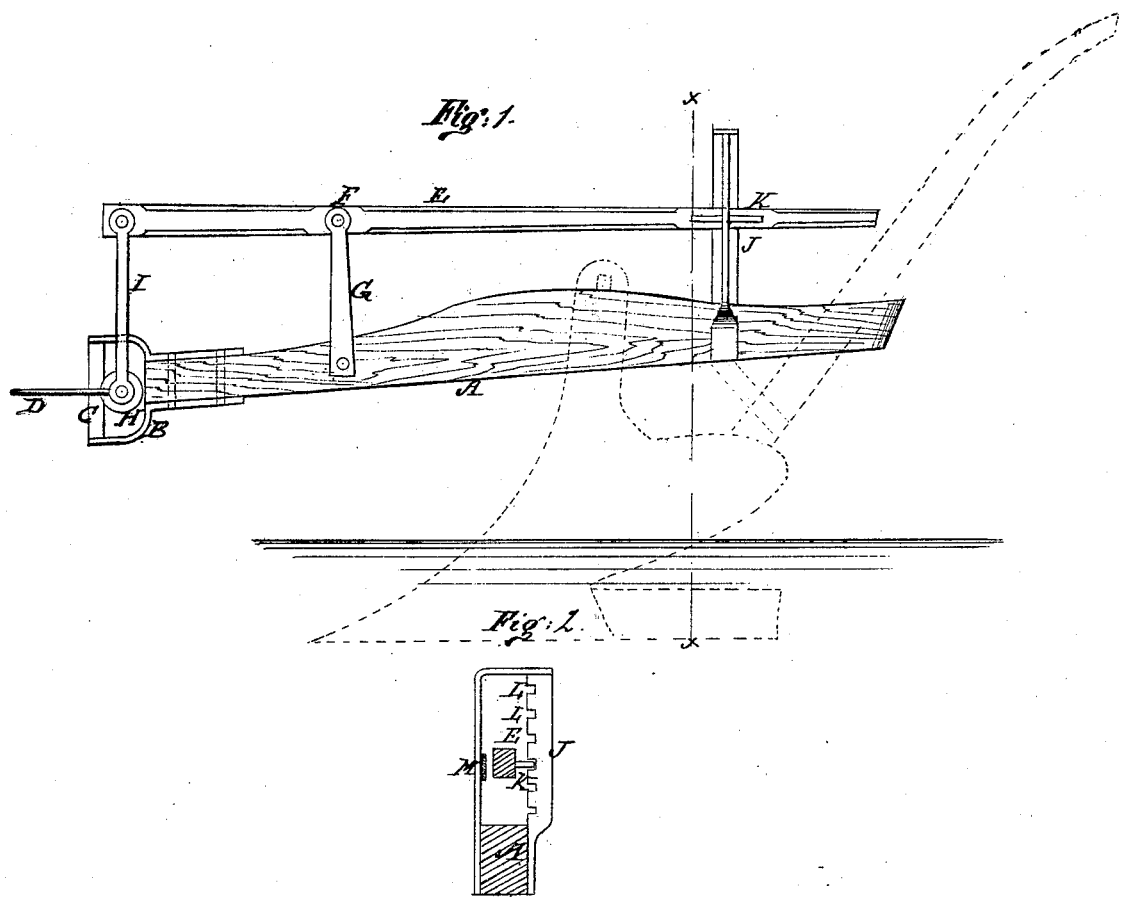

CORNEALIUS L. JACKSON, OF MILLERSBURG, ILLINOIS.

IMPROVEMENT IN ADJUSTABLE DRAFT DEVICES FOR PLOWS.

Specification forming part of Letters Patent No. 109,215, dated November 15, 1870.

*To all whom it may concern:*

Be it known that I, CORNEALIUS L. JACKSON, of Millersburg, in the county of Mercer and State of Illinois, have invented a new and useful Improvement in Adjustable Draft Devices for Plows; and I do hereby declare that the following is a full, clear, and exact description thereof, which will enable others skilled in the art to make and use the same, reference being had to the accompanying drawings, forming part of this specification.

This invention relates to a new and useful improvement in a device for varying the line of draft of plows when in motion or at rest, so that the depth of furrow may be varied according to the form or surface of the ground.

In the accompanying drawings, Figure 1 represents a side view of the arrangement attached to a plow-beam, the mold-board and handles being shown in dotted lines. Fig. 2 is a vertical cross-section, looking to the right from the line $x$ $x$ of Fig. 1.

Similar letters of reference indicate corresponding parts.

A is the plow-beam, which is connected with the mold-bold and handles in the ordinary manner.

B is the clevis, which, instead of having notches in front for varying the line of draft in the ordinary manner, has an upright bar, C, upon which the position of the draft-clevis D is varied.

E is a lever, which has its fulcrum at F on the double stand G.

H is a roll, which is connected with the forward end of the lever E by means of connecting-bars I. The draft-clevis D is attached to the arbor of the roll, as are the connecting-bars I.

J is a stand on the back part of the beam, by means of which the long end of the lever is fastened in any desired position. By moving the lever up or down the position of the roll and draft-clevis is varied for plowing deep or shallow, as may be desired. The end of the lever being always within reach of the plow-holder, it will be seen that the line of draft may be varied at will while the plow is in motion. The mode of securing the lever in any desired position is seen in Fig. 2.

K is a plate on the side of the lever, which, as the lever is moved up or down, enters the notches L of the stand.

M is a spring attached to the lever, which bears against the opposite side of the stand, and serves to force the lever and plate toward the notches.

The arrangement is so plainly shown in the drawings that further description is deemed unnecessary.

Having thus described my invention, I claim as new and desire to secure by Letters Patent—

The combination of a clevis-bar, C, draft device D, lever E, roll H, and connecting-bar, substantially as and for the purpose specified.

CORNEALIUS L. JACKSON.

Witnesses:
SILAS H. RIDDELL,
JAMES L. RIDDELL.